(12) United States Patent
Mukasa et al.

(10) Patent No.: US 6,655,196 B2
(45) Date of Patent: Dec. 2, 2003

(54) SCANNING PROBE MICROSCOPE

(75) Inventors: Koichi Mukasa, Sapporo (JP); Kazuhisa Sueoka, Sapporo (JP); Naoki Kamo, Sapporo (JP); Hirotaka Hosoi, Sapporo (JP); Makoto Sawamura, Sapporo (JP)

(73) Assignee: Hokkaido University, Sapporo (JP)

( * ) Notice: Subject to any disclaimer, the term of this patent is extended or adjusted under 35 U.S.C. 154(b) by 0 days.

(21) Appl. No.: 10/175,821

(22) Filed: Jun. 21, 2002

(65) Prior Publication Data

US 2003/0010099 A1 Jan. 16, 2003

(30) Foreign Application Priority Data

Jun. 26, 2001 (JP) ......................... 2001-192149

(51) Int. Cl.$^7$ .......................... G01N 13/16; G01N 13/12
(52) U.S. Cl. ......................... 73/105; 250/306
(58) Field of Search ............................ 73/105; 250/306

(56) References Cited

U.S. PATENT DOCUMENTS

| 5,363,697 A | * 11/1994 | Nakagawa | .............. 73/105 |
| 6,159,742 A | * 12/2000 | Lieber et al. | .............. 436/164 |
| 6,346,189 B1 | * 2/2002 | Dai et al. | .............. 73/105 |
| 6,401,526 B1 | * 6/2002 | Dai et al. | .............. 73/105 |

FOREIGN PATENT DOCUMENTS

| EP | 0 355 241 A1 | 2/1990 | |
| JP | A 10-332718 | 12/1998 | .............. 73/105 |
| JP | A 2000-321292 | 11/2000 | .............. 250/306 |
| JP | A 2002-202238 | 7/2002 | .............. 250/306 |
| WO | WO 98/05920 A1 | 2/1998 | .............. 73/105 |
| WO | WO 99/60169 | 11/1999 | |
| WO | WO 00/09443 | 2/2000 | .............. 73/105 |

OTHER PUBLICATIONS

Cheung, C.L. et al., "Carbon Nantube Atomic Force Microscopy Tips: Direct Growth by Chemical Vapor Deposition and Application to High-Resolution Imaging", PNAS, Apr. 11, 2000, vol. 97, No. 8, pp. 3809-3813.*

Moy, V.T. et al. "Adhesive Forces Between Ligand and Receptor Measured by AFM", Colloids and Surfaces A: Physicochemical and Engineering Aspects, vol. 93, 1994, pp. 343-348.*

* cited by examiner

Primary Examiner—Daniel S. Larkin
(74) Attorney, Agent, or Firm—Oliff & Berridge, PLC

(57) ABSTRACT

At the forefront of a probe is formed a carbon nanotube having an armchair type crystal structure or of which the forefront is chemically modified with modifying molecules.

13 Claims, 3 Drawing Sheets

SCANNING PROBE MICROSCOPE

BACKGROUND OF THE INVENTION

1. Field of the Invention

This invention relates to a scanning probe microscope.

2. Description of the Prior Art

A surface condition of a substance can be investigated by a scanning probe microscope. In addition, atoms and molecules can be manipulated precisely in the order of nanometer dimension to atomic dimension. Therefore, the scanning probe microscope plays an important role in nanotechnology.

With a conventional scanning probe microscope, however, only the aspect ratio of a surface of a substance or the like can be measured, but other physical properties of the substance, e.g., magnetic properties, can not be measured. The application of the scanning probe microscope is restricted, so can not be employed in a biochemical field.

SUMMERY OF THE INVENTION

It is an object of the present invention to provide a new scanning probe microscope which can measure and investigate various properties and can be applied for various fields, such as a biochemical field.

For achieving the above object, this invention relates to a scanning probe microscope comprising:

a cantilever, a probe formed on the cantilever, and a carbon nanotube having an armchair type crystal structure and electric conduction property which is formed at the forefront of the probe.

This invention also relates to a scanning probe microscope comprising:

a cantilever, a probe formed on the cantilever, and a carbon nanotube of which the forefront is chemically modified and substituted with modifying molecules and which is formed at the forefront of the probe.

In the scanning probe microscope of the present invention, a carbon nanotube is formed at the forefront of a probe made of a Si material or the like, so the resulting composite type probe is utilized as an actual probe. Since the diameter of the carbon nanotube is set within 0.4–50 nm, a minute structure of a substance can be measured and investigated with the scanning probe microscope.

In the first scanning probe microscope of the present invention, the carbon nanotube composing the probe has an armchair type crystal structure as shown in FIG. 1. Such a carbon nanotube tends to exhibit metallic properties, so comes to have electric conduction.

Therefore, if the quantum conduction of the carbon nanotube is utilized, physical properties of a substance can be measured and investigated precisely. The carbon nanotube may be connected with a spin-polarization electron beam source made of a ferromagnetic material, such as Fe, a super-conducting material, such as Al split in spin by a magnetic field of large strength, or a semi-conducting material, such as GaAs, which is optically excited. If the carbon nanotube is connected with the electron source, electrons are injected into a given magnetic substance and then, the tunnel current or the trajectory electron emission current from the magnetic substance is detected. In this case, the magnetic structure or the spatial distribution, such as spin polarization of the magnetic substance, can be investigated on the tunnel current and the trajectory electron emission current.

In the second scanning probe microscope of the present invention, the forefront of the carbon nanotube is modified by modifying molecules. Therefore, by selecting the kind and amount of modifying molecule appropriately, the resulting scanning probe microscope can be applied for various fields, such as a biochemical field.

BRIEF DESCRIPTION OF THE DRAWINGS

For better understanding of the present invention, reference is made to the attached drawings, wherein.

DESCRIPTION OF THE PREFERRED EMBODIMENTS

Figure 2:
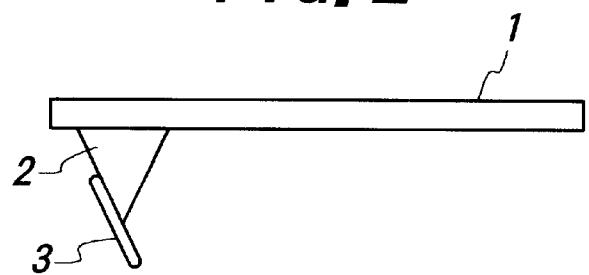
FIG. 2 is a side view schematically showing the main portion of a scanning probe microscope according to the present invention.
Figure 3:
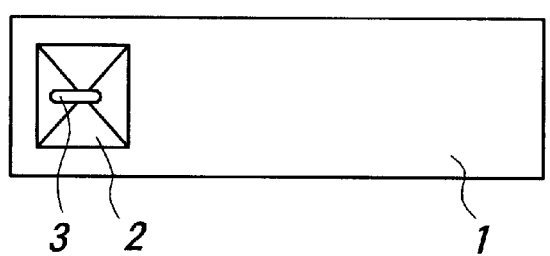
FIG. 3 is a bottom plan view of the scanning probe microscope illustrated in FIG. 2, as viewed from the lower side.

This invention will be described in detail with reference to the accompanying drawings. FIG. 2 is a side view schematically showing the main portion of a scanning probe microscope according to the present invention, and FIG. 3 is a bottom plan view of the scanning probe microscope illustrated in FIG. 2, as viewed from the lower side. As is apparent from FIGS. 2 and 3, a scanning probe microscope according to the present invention includes a cantilever 1, a probe 2 made of a Si material and formed on the cantilever 1, and a carbon nanotube 3 formed at the forefront of the probe 2. Therefore, the probe 2 and the carbon nanotube 3 constitute a composite type probe.

Figure 1:
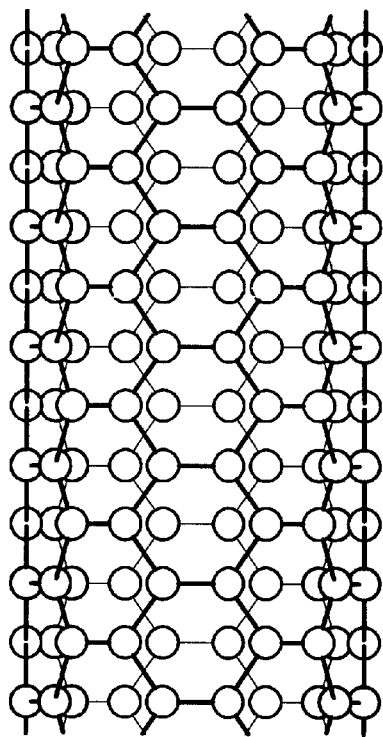
FIG. 1 is a schematic view showing a crystal structure of an armchair type carbon nanotube.

In the first scanning probe microscope of the present invention, it is required that the carbon nanotube 3 has an armchair type crystal structure as shown in FIG. 1. In this case, the quantum conduction of the carbon nanotube 3 can be utilized for measurement and investigation.

Figure 4:
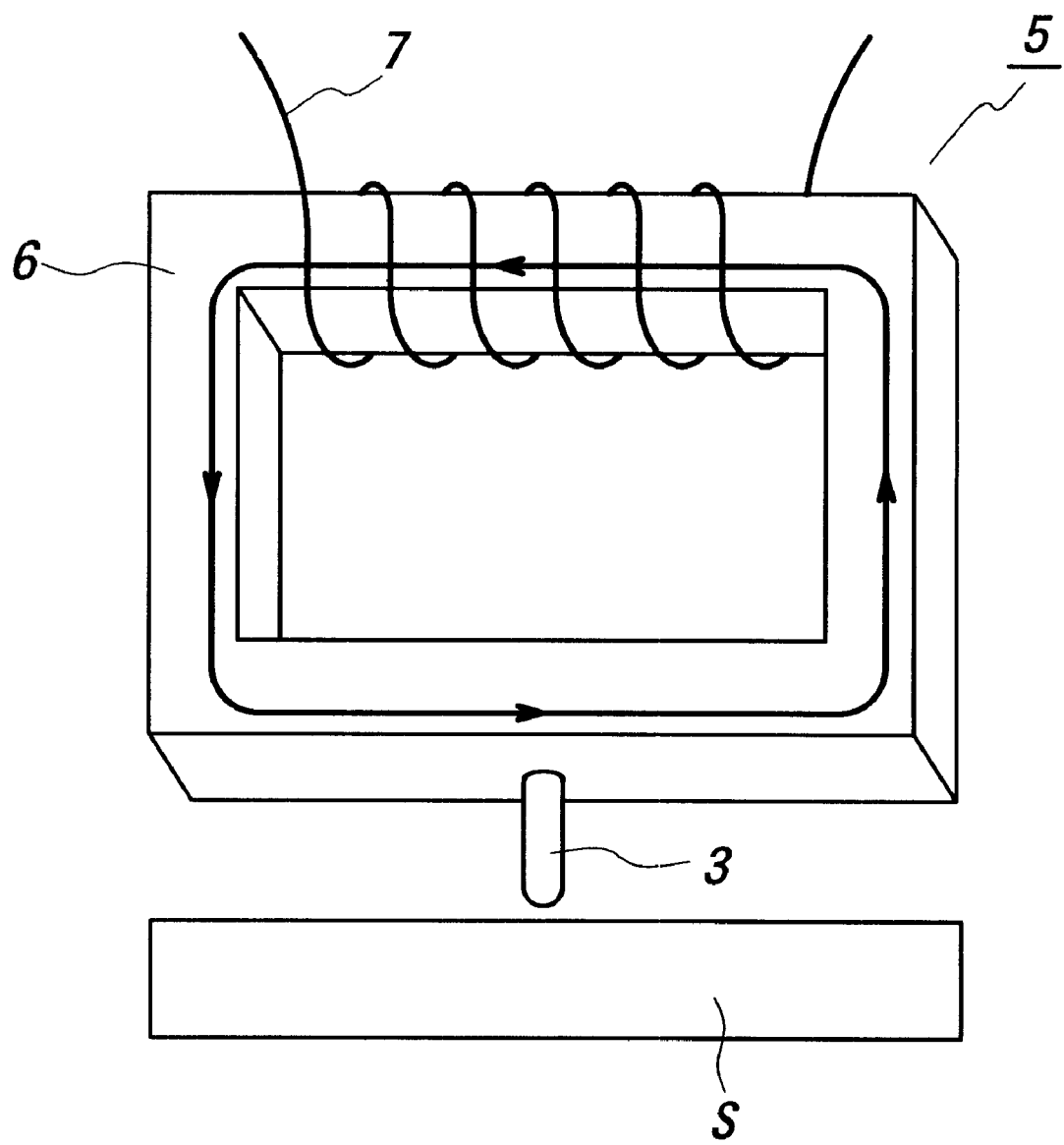
FIG. 4 is a schematic view showing another scanning probe microscope according to the present invention.

FIG. 4 shows the state where a spin polarization electron beam source is attached to the carbon nanotube 3 shown in FIGS. 2 and 3. As is apparent from FIG. 4, the spin polarization electron beam source 5 is attached to the rear side of the carbon nanotube 3. The beam source 5 is made of a ferromagnetic metallic member 6, such as Fe, and a coil for excitation is whirled around the member 6.

A given current is flown in the coil 7 to magnetize the ferromagnetic member 6, and spin electrons are injected into a given magnetic substance S disposed so as to oppose to the carbon nanotube 3 from the carbon nanotube 3. Then, the tunnel current or the trajectory electron emission current from the magnetic substance S is detected, and then, the magnetic resistance of the magnetic substance S is measured. As a result, the surface magnetic structure or the spatial distribution such as spin polarization of the magnetic substance S can be measured and investigated on the tunnel current or the trajectory electron emission current detected.

In addition, when the direction of the current to be flown in the coil 7 is reversed, the ferromagnetic metallic member 6 is magnetized reversely, so that spin electrons having the reversed spin direction can be injected.

The spin polarization electron beam source 5 may be made of a superconducting material, such as Al split in spin by a magnetic field of large strength, a semi-conducting material, such as GaAs which is optically excited.

In the second scanning probe microscope of the present invention, it is required that the forefront of the carbon nanotube 3 illustrated in FIGS. 2 and 3 is chemically modified. In this case, carbon atoms located at the forefront of the carbon nanotube 3 are substituted with modifying molecules. The kind and amount of modifying molecule can be selected appropriately on the kind of a substance to be measured and investigated and a physical property of the substance to be measured and investigated. Therefore, the second scanning probe microscope can be applied for various fields such as a biochemical field, to which a conventional scanning probe microscope can not be applied as mentioned above.

In the second scanning probe microscope, the electric conduction for the carbon nanotube is not always required. Therefore, the carbon nanotube can have a zigzag type crystal structure or a chiral type crystal structure as well as an armchair type crystal structure.

Figure 5:
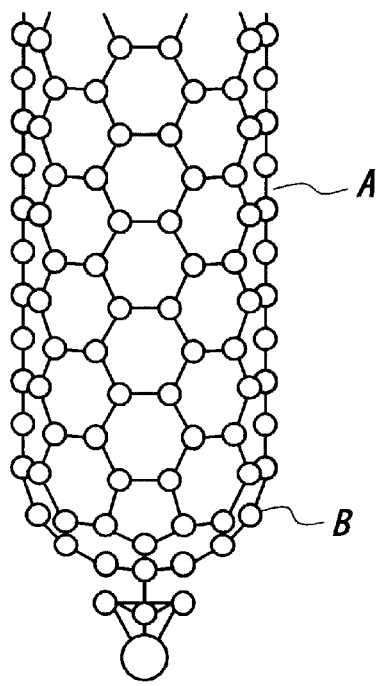
FIG. 5 is a schematic view showing a carbon nanotube of which the forefront is modified with transition metal complex molecules in a scanning probe microscope according to the present invention.

FIG. 5 is a crystal structural view showing a carbon nanotube of which the forefront is chemically modified with transition metal complex molecules. As is apparent from FIG. 5, in this case, the carbon atoms A of the carbon nanotube are partially substituted with the transition metal complex molecules B at the forefront thereof.

Therefore, if the minute structure of the carbon nanotube having a diameter of 0.4–50 nm and a physical property of the complex molecules B are utilized, the magnetic structure of a surface of the magnetic substance can be measured and investigated in the order of atomic dimension on an interaction force based on a magnetic dipole interaction or an exchange interaction for the magnetic substance.

As the transition metal complex, Fe phthalocyanine, Ni phthalocyanine, Co phthalocyanine, Fe porphyrin, Ni porophyrin, Co porphyrin, Fe-TMHD, and Ni-TMHD may be exemplified. Preferably, the Fe phthalocyanine is employed because it is easily available and modified.

Figure 6:
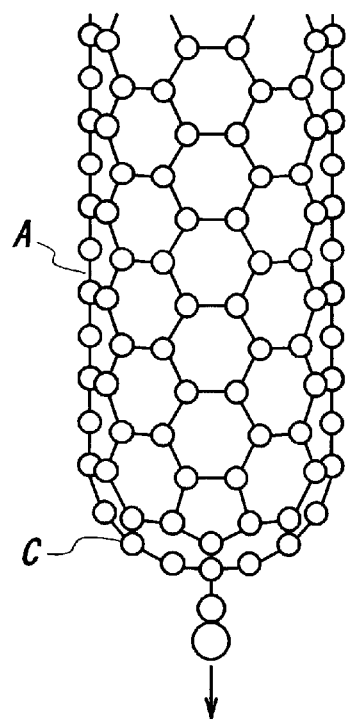
FIG. 6 is a schematic view showing another carbon nanotube of which the forefront is modified with radical molecules in a scanning probe microscope.

FIG. 6 is a crystal structural view showing a carbon nanotube of which the forefront is chemically modified with radical molecules. In this case too, the carbon atoms A of the carbon nanotube are partially substituted with the radical molecules C at the forefront thereof. The term "radical molecule" collectively means a molecule including a radical species.

If the carbon nanotube of which the forefront is modified with the radical molecules is employed, a magnetic property can be measured by utilizing unpaired electrons to constitute the radical molecules. Therefore, when the carbon nanotube is set in the vicinity of a surface of a magnetic substance, and then, the magnetic dipole interaction or the exchange interaction for the magnetic substance is detected, the magnetic structure of the surface of the magnetic substance can be investigated in the order of atomic dimension.

If a given physical value is detected by utilizing the reactivity between the radical species of the radical molecules and a given substance, a given physical property of the substance can be measured and investigated.

As the radical molecule, TTF type tetra-radical donor molecule, nitroxyl radical, N-oxyltetramethylpiperidine derivative, and N-oxyldimethyloxazolidine may be exemplified. Preferably, the TTF type tetra-radical donor molecule is employed because it is easily available and modified.

The forefront of the carbon nanotube may be modified and substituted with antibody molecules. In this case, the antibody molecules exhibit large antibody-antigen reaction for given antigen molecules, so the distribution of antigen molecules in a given living body can be measured by utilizing the antibody-antigen reaction. For example, by detecting a given physical value such as interaction force on the antibody-antigen reaction, the distribution of the antigen atoms can be measured.

Moreover, the forefront of the carbon nanotube can be modified and substituted with guanine molecules or adenine molecules which are constituents of DNA. The guanine molecules and the adenine molecules are interacted strongly with cytosine molecules or thymine molecules. Therefore, if a physical value, such as chemical binding force on the interaction is detected, the distribution of the cytosine molecules and the thymine molecules can be measured in the order of molecular dimension.

In contrast, the forefront of the carbon nanotube may be modified with the cytosine molecules or the thymine molecules which constitute DNA. In this case, the distribution of the guanine molecules or the thymine molecules can be measured in the order of molecular dimension.

In addition, the forefront of the carbon nanotube may be modified with thymine molecules or uracil molecules which are constituents of RNA. In this case, the distribution of the uracil molecules or the thymine molecules can be measured in the order of molecular dimension.

The scanning probe microscope of the present invention as shown in FIGS. 2 and 3 will be fabricated as follows: First of all, a base made of a Si material is etched by utilizing an etching gas, such as $SF_6$, to form the cantilever 1 and the probe 2 in unified. Then, a methanol solution catalyst containing metallic ions, such as Fe ions or Cr ions, is coated at the forefront of the probe 2 by means of spin coating. Then, the cantilever 1 and the probe 2 are set in a furnace, and heated at a temperature within 600–1200° C.

Then, a methane gas is contacted with the coated methanol solution catalyst. In this case, vapor growth occurs along the side wall of the probe 2 to form the conduction type armchair type carbon nanotube 3.

Herein, plural carbon nanotubes are made by means of a vapor-phase growing method or an arc-discharging method, and then, arranged in knife-edge shape by means of cataphoresis to be joined with the probe 2 with adhesive under the observation using a SEM. The carbon nanotubes is joined with the probe 2 with a carbon-covering film which is formed by means of an electron beam deposition method so as to cover the edge portions of the carbon nanotube.

In the second scanning probe microscope of the present invention, the forefront of the carbon nanotube is contacted with a solution or a gas containing such modifying molecules to be chemically modified and substituted with the modifying molecules.

As shown in FIG. 5, in the case that the forefront of the carbon nanotube is modified and substituted with the transition metal complex molecules, the forefront is contacted with an organic solution made of an organic solvent, such as ethanol and Fe phthalocyanine contained therein.

As shown in FIG. 6, in the case that the forefront of the carbon nanotube is modified and substituted with the radical molecules, the forefront is contacted with an organic solution made of an organic solvent, such as ethanol and TTF-type tetra-radical donor molecules contained therein. In the case that the forefront of the carbon nanotube is modified with antibody molecules, guanine molecules or adenine molecules, a given solvent where the modifying molecules are contained is appropriately selected on the kind of a substance to be measured and investigated and the physical properties of the substance to be measured and investigated.

The modification of the forefront of a carbon nanotube can be carried out without such a solution or a gas as follow. First of all, given modifying molecules are conveyed to the forefront of the carbon nanotube by means of an optical tweezer. Then, the forefront of the carbon nanotube is chemically reacted with the modifying molecules under optical irradiation which is auxiliary means, to be modified with the modifying molecules.

Although the present invention was described in detail with reference to the above examples, this invention is not limited to the above disclosure and every kind of variation and modification may be made without departing from the scope of the present invention.

In the scanning probe microscope of the present invention, the carbon nanotube having an armchair type crystal structure or of which the forefront is chemically modified with given modifying molecules. Therefore, various physical properties for various substances can be measured and investigated on the minute dimension and the electric conduction of the carbon nanotube and the physical property of the modifying molecules.

What is claimed is:

1. A scanning probe microscope comprising:

a cantilever, a probe formed on said cantilever, and a carbon nanotube of which a forefront is chemically modified and substituted with metallic complex molecules containing transition metal elements and which is formed at a forefront of said probe.

2. The scanning probe microscope as defined in claim 1, wherein said metallic complex molecules are Fe phthalocyanine molecules.

3. The scanning probe microscope as defined in claim 1, wherein said forefront of said carbon nanotube is modified by contacting said forefront of said carbon nanotube to a solution or a gas containing said metallic complex molecules.

4. The scanning probe microscope as defined in claim 1, wherein said forefront of said carbon nanotube is modified by conveying said metallic complex molecules to said forefront of said carbon nanotube with an optical tweezer, and chemically reacting said metallic complex molecules with said forefront of said carbon nanotube.

5. A scanning probe microscope comprising:

a cantilever, a probe formed on said cantilever, and a carbon nanotube of which a forefront is chemically modified and substituted with radical molecules and which is formed at a forefront of said probe.

6. The scanning probe microscope of claim 5, wherein the radical molecules are TTF type tetra-radical donor molecules.

7. The scanning probe microscope as defined in claim 6, wherein said forefront of said carbon nanotube is modified by contacting said forefront of said carbon nanotube to a solution or a gas containing said TTF type tetra-radical donor molecules.

8. The scanning probe microscope as defined in claim 6, wherein said forefront of said carbon nanotube is modified by conveying said TTF type tetra-radical donor molecules to said forefront of said carbon nanotube with an optical tweezer, and chemically reacting said TTF type tetra-radical donor molecules with said forefront of said carbon nanotube.

9. The scanning probe microscope as defined in claim 5, wherein said forefront of said carbon nanotube is modified by contacting said forefront of said carbon nanotube to a solution or a gas containing said radical molecules.

10. The scanning probe microscope as defined in claim 5, wherein said forefront of said carbon nanotube is modified by conveying said radical molecules to said forefront of said carbon nanotube with an optical tweezer, and chemically reacting said radical molecules with said forefront of said carbon nanotube.

11. A scanning probe microscope comprising:

a cantilever, a probe formed on said cantilever, and a carbon nanotube of which a forefront is chemically modified and substituted with modifying molecules and which is formed at a forefront of said probe, wherein said forefront of said carbon nanotube is modified by conveying said modifying molecules to said forefront of said carbon nanotube with an optical tweezer, and chemically reacting said modifying molecules to said forefront of said carbon nanotube.

12. A scanning probe microscope comprising:

a cantilever, a probe formed on said cantilever, a carbon nanotube having an armchair type crystal structure and electric conduction property which is formed at a forefront of said probe, and a spin polarization electron beam source which is connected to said carbon nanotube.

13. The scanning probe microscope as defined in claim 12, wherein said carbon nanotube is fabricated by coating a methanol solution catalyst containing metal ions, and subsequently contacting a methane gas onto said forefront of said probe by thermal CVD.

* * * * *